Feb. 25, 1941. J. W. LEWIN 2,233,292
PIPE BENDER
Filed Sept. 10, 1938 2 Sheets-Sheet 1
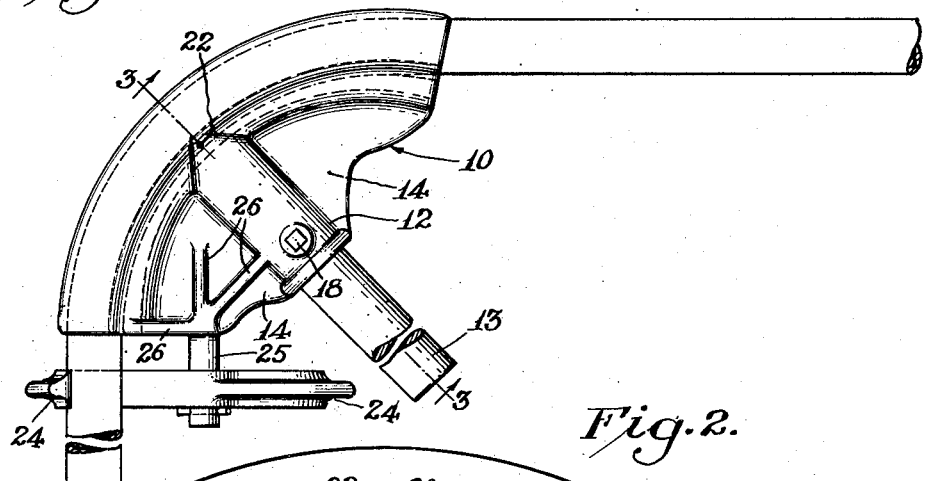
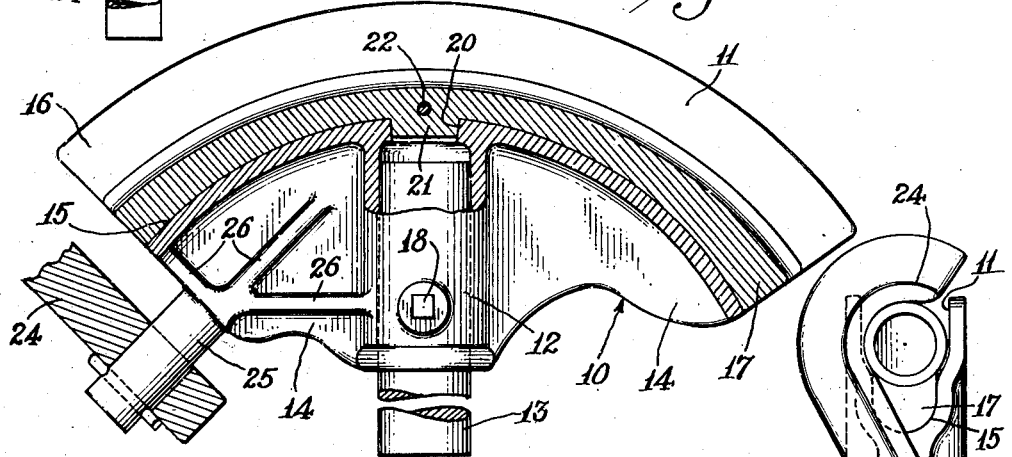
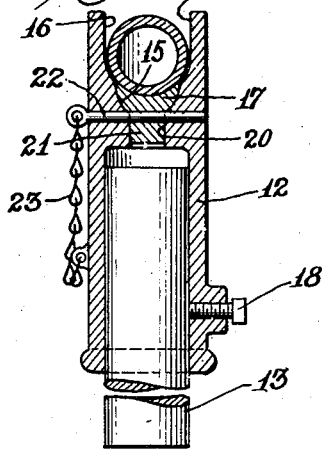
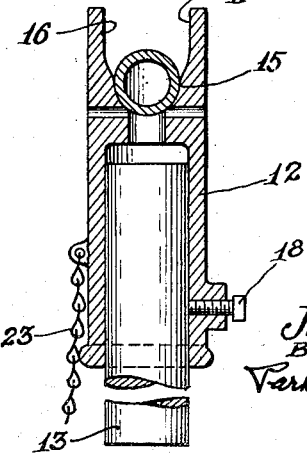
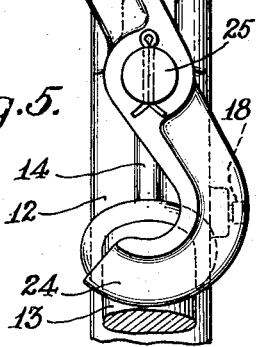
Inventor
Jacob W. Lewin
BY
Parker, Carlson, Pitzner & Hubbar
Attorneys.

Feb. 25, 1941.  J. W. LEWIN  2,233,292
PIPE BENDER
Filed Sept. 10, 1938   2 Sheets-Sheet 2
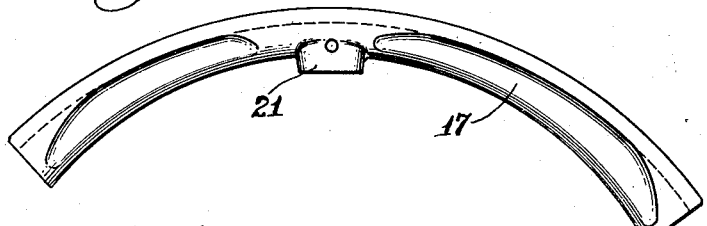
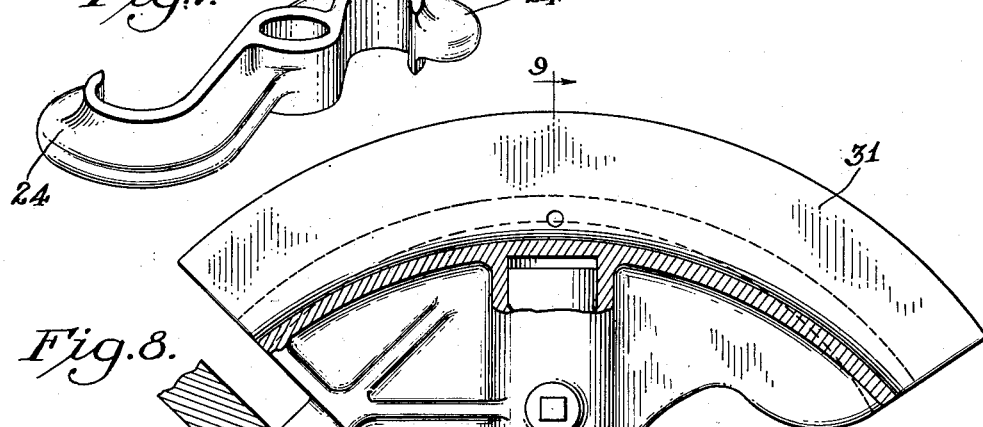
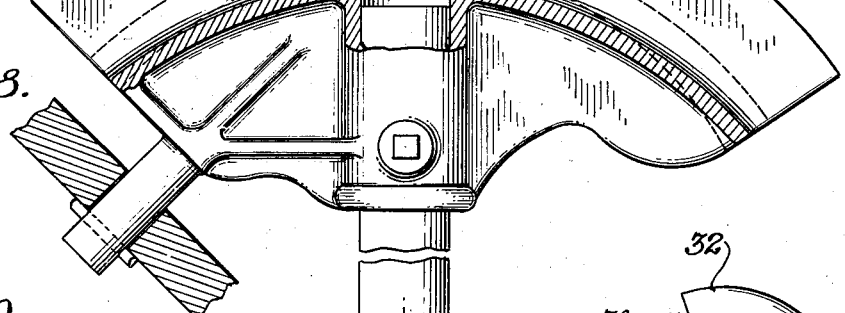
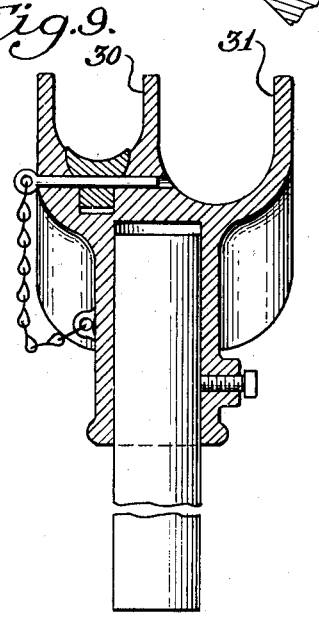
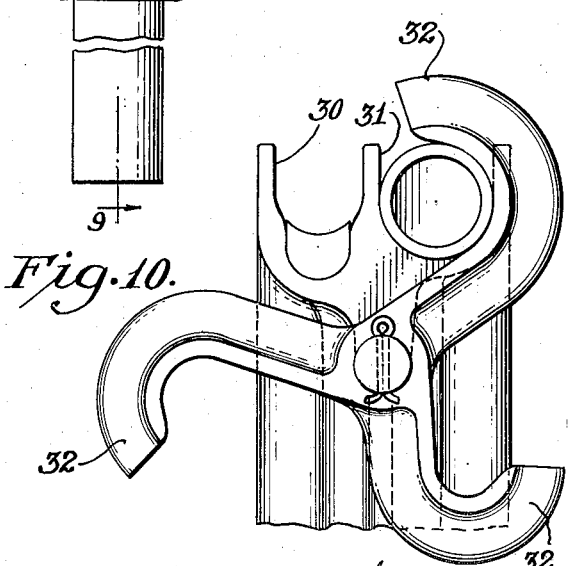
Inventor
Jacob W. Lewin
BY Parker, Carlson, Pitzner & Hubbard
Attorneys.

Patented Feb. 25, 1941

2,233,292

UNITED STATES PATENT OFFICE 2,233,292

PIPE BENDER

Jacob W. Lewin, Oak Park, Ill.

Application September 10, 1938, Serial No. 229,271

2 Claims. (Cl. 81—15)

The invention relates generally to a device for bending pipe or the like and more particularly to a portable bender adapted especially for use by electricians in bending electrical conduit.

The general object of the invention is to provide a pipe bender adapted for use in connection with a plurality of sizes of pipe.

More specifically, it is an object to provide a pipe bender constructed to bend pipe of more than one of the sizes commonly used, the device being adapted not only to accommodate the different diameters of pipe but also being arranged to bend the different sizes to different curvatures suitable to the respective sizes.

It is also an object to provide a pipe bender adapted for use with different sizes of pipe, which is simple and inexpensive in its construction and which requires only a simple change to adapt it for a different size of pipe.

Other objects and advantages will become apparent from the following description taken in connection with the accompanying drawings, in which:

Figure 1 is a side elevational view of a device embodying the features of the invention.

Fig. 2 is a longitudinal section of the device shown in Fig. 1.

Figs. 3 and 4 are transverse sections taken on the line 3—3 of Fig. 1 and showing the device arranged for different sizes of pipe.

Fig. 5 is an end elevational view of the device shown in Fig. 1.

Figs. 6 and 7 are views of parts of the device shown in Fig. 1.

Fig. 8 is a longitudinal section similar to Fig. 2 but of a modified form of device.

Fig. 9 is a transverse section taken on the line 9—9 of Fig. 8.

Fig. 10 is an end elevational view of the device shown in Fig. 8.

In installing electrical work in building construction where conduit or pipe is used, many bends in the pipe are necessitated to adapt it for the particular structure of the building. Such bends are usually made on the job since much of the installation of the pipe is a matter of cutting and fitting. Most of the pipe or conduit used in the ordinary run of construction is of the one-half inch size while three-quarter inch size is also used to a large extent. It is therefore desirable to provide the electricians with an easy means for bending both these sizes of pipe.

The present invention provides a bender readily adaptable for use by the electricians on a construction job and arranged so that a plurality of sizes of pipe may be bent thereby. In view of the fact that most pipe used is one-half inch and three-quarter inch, the bender is preferably made to accommodate these two sizes. Generally the device comprises a body having an arcuate edge provided with a groove to receive the pipe, a clamp being provided at one end of the groove to hold the pipe in place. The body member is provided with a handle by which it may be manipulated to cause the pipe to bend into the form of the arcuate groove. The groove is shaped to receive a given size of pipe, and an insert is provided to be fitted into the groove by which the latter is adapted to receive a second size of pipe. The clamping member at the end of the body is also adapted for use with both sizes of pipe. The insert above referred to not only adapts the groove for a different diameter of pipe but also changes the curvature of the arcuate form so that the respective sizes of pipe are bent to curvatures suitable therefor.

As shown in the drawings, the preferred embodiment of the invention comprises a body indicated generally at 10. The body comprises preferably a sector-shaped casting having a channel-shaped arcuate portion providing a groove 11 in its edge. Extending radially inward from the channel-shaped portion is a tubular portion 12 providing a socket to receive a bar 13 for manually applying sufficient leverage to bend the pipe. To hold the bar 13 in place, a set screw 18 may be provided. Extending between the channel-shaped portion and the socket portion are webs 14 for strengthening the casting.

The groove 11 is shaped so that it may be adapted to receive different sizes of pipe. To this end, the inner portion of the groove indicated at 15 is of the proper cross-section to receive, in the present instance, a half-inch pipe as shown in Fig. 4, while the outer portion of the groove, indicated at 16, is of sufficient width to receive, in the present instance, a three-quarter inch pipe as shown in Fig. 3. The arc upon which the inner part 15 of the groove is formed is a proper curvature for the one-half inch pipe.

To adapt the groove for the three-quarter inch pipe an insert 17 is provided, which is shaped to fit in the inner part 15 of the groove and has its outer surface formed to provide a bottom for the larger size of body adapted to fit in the portion 16. Since it is desirable to bend the larger or three-quarter inch pipe on a curvature of greater radius, the insert 17 has its outer surface formed on such curvature. Thus when it is desired to bend the one-half inch pipe the inner part of the groove is utilized without the insert 17. To bend the three-quarter inch pipe the insert is put in place and the groove is of proper shape to receive the larger size of pipe.

To prevent the insert 17 from shifting longitudinally in the groove, a pocket 20 is formed centrally thereof to receive a lug 21 formed on the insert. A cross pin 22 may be inserted through the body and insert to hold the two together, the cross pin being preferably attached to the body by a chain 23 or the like to prevent the pin from being lost.

In order to clamp the pipe in the groove while being bent, a clamping member is provided at one end of the body. In its preferred form the clamping member has its respective ends formed in hooks 24 adapted to swing over the pipe when the latter is in place in the groove. The clamping member is preferably supported intermediate its ends by a pivot 25 extending longitudinally from the body and parallel to a tangent to the groove at the end thereof. In the present instance the pivot 25 is formed integrally with the body casting and is longer than the thickness of the hook to permit the hook to slide thereon and thereby facilitate release of the hook after the pipe is bent. Ribs 26 are provided on the body for reenforcing the pin.

The modified form of the device shown in Figs. 8, 9, and 10 is arranged for bending pipe of three different sizes. To this end the body is provided with a pair of grooves 30 and 31. One of these grooves, in the present instance the groove 30, is constructed similarly to that shown in the other form in that it has its inner portion formed to receive one size of pipe and its outer portion to receive a larger size of pipe with an insert to adapt the groove for such larger size. Groove 31 is formed to receive a still larger size of pipe, in the present instance, a one-inch pipe. Since it is desirable to bend the one-inch pipe on a larger arc, the bottom of the groove 31 is formed on an arc differing from the arcs of groove 30.

The clamping member in this instance is similar to that shown in the other form but is provided with three hooks 32 respectively adapted to swing over the respective sizes of pipes when placed in the different grooves, the spacing of the hooks from the pivot being proper to conform to the curvatures provided by the various grooves.

In use, a piece of pipe to be bent is placed in the groove and the hook-like member 24 swung over the pipe to hold it in place. The other end of the pipe may then be clamped by an ordinary vise or held against movement by resting it on the floor with the plane of the bender vertical. The bender is manually turned, the hand lever 13 providing sufficient leverage. The pipe is thus bent into the groove which has a curvature suitable for the size of pipe bent. When the larger size of pipe is to be bent, the insert 17 is put in place in the groove and held by the pin 22. The groove thus is properly adapted in cross section for such larger size of pipe and its curvature is suitable to make a proper bend. After the pipe has been bent, the bender is turned slightly in a reverse direction, thus releasing the hook member 24. Then by tipping the device sidewardly, the hook swings free of the pipe. Thus the structure facilitates the release of the pipe since the operator does not have to stoop down to release the hook.

From the foregoing it will be evident that I have provided a pipe bender constructed to bend a plurality of sizes of pipe such as those most commonly used. The device not only is adapted to receive the different diameters of pipe but also is so formed as to bend the different sizes to suitable curvatures for such sizes. The bender is of simple and inexpensive construction and is readily adapted without complicated changes to receive the different sizes of pipe.

I claim as my invention:

1. A pipe bender comprising, in combination, a body having an arcuate edge portion, a groove in said edge portion having an inner part shaped to receive a given size of pipe and an outer part shaped to receive a larger pipe, an insert having an inner surface shaped to fit into the inner part of the groove and a curved outer surface shaped to form a continuation of the sides of the outer portion of the groove and provide a pipe gripping surface for the same, and means carried on said body for clamping a pipe in place at one end of the groove.

2. A pipe bender comprising, in combination, a body having an arcuate edge portion, a groove in said edge portion having an inner part shaped to receive a given size of pipe and an outer part shaped to receive a larger size of pipe, said inner and outer parts of the groove being formed on different arcs, an insert adapted to fit into the inner part of the groove, said insert having its inner surface formed on an arc corresponding to that of the inner part of the groove and its outer surface formed on an arc corresponding to that of the outer part of the groove so as to provide a bottom for said outer part of the groove, and clamping means mounted on said body for cooperation with pipes of either size.

JACOB W. LEWIN.